(12) United States Patent
Liu et al.

(10) Patent No.: US 12,003,170 B2
(45) Date of Patent: Jun. 4, 2024

(54) SOFT-START CIRCUIT FOR POWER-UP

(71) Applicant: Fremont Micro Devices Corporation, Guangdong (CN)

(72) Inventors: Jianfeng Liu, Guangdong (CN); Yuquan Huang, Guangdong (CN); Dennis Sinitsky, Guangdong (CN)

(73) Assignee: Fremont Micro Devices Corporation, Shenzhen (CN)

( * ) Notice: Subject to any disclaimer, the term of this patent is extended or adjusted under 35 U.S.C. 154(b) by 231 days.

(21) Appl. No.: 17/854,049

(22) Filed: Jun. 30, 2022

(65) Prior Publication Data
US 2023/0299663 A1 Sep. 21, 2023

(30) Foreign Application Priority Data
Mar. 15, 2022 (CN) .......................... 202210256141.4

(51) Int. Cl.
*H02M 1/36* (2007.01)
*H02M 1/00* (2006.01)
(52) U.S. Cl.
CPC ........... *H02M 1/36* (2013.01); *H02M 1/0025* (2021.05)

(58) Field of Classification Search
CPC .............................. H02M 1/36; H02M 1/0025
See application file for complete search history.

(56) References Cited

U.S. PATENT DOCUMENTS

| 11,277,066 B2 * | 3/2022 | Chang ..................... H02M 1/32 |
| 2010/0320935 A1 * | 12/2010 | Wibben ............... H05B 45/392 315/294 |

* cited by examiner

*Primary Examiner* — Rafael O De Leon Domenech

(57) ABSTRACT

Disclosed is a soft-start circuit for power-up, which includes a reference value generation circuit, a protection threshold generation circuit and a control circuit. The reference value generation circuit outputs a reference value, which increases slowly, during a start-up process for power-up. The protection threshold generation circuit outputs a protection threshold, which increases slowly, during the start-up process for power-up. The control circuit controls an output voltage to increase slowly along with the reference value based on the reference value, during the start-up process for power-up, and to limit an output current based on the protection threshold to limit the output voltage, during the start-up process for power-up. In this way, even if the output current must operate at the peak current, a smoother current output is realized, and operation at the maximum peak current for a long-time during start-up is not allowed.

19 Claims, 13 Drawing Sheets (a)

(b)

SOFT-START CIRCUIT FOR POWER-UP

CROSS REFERENCE TO RELATED APPLICATIONS

The present application claims the benefit of Chinese Patent Application No. 2022102561414 filed on Mar. 15, 2022, the contents of which are incorporated herein by reference in their entirety.

TECHNICAL FIELD

The present disclosure relates generally to an electronic circuit technical field, and more particularly relates to a soft-start circuit for power-up.

BACKGROUND

At present, the commonly used implementation method of soft-start for power-up mainly realizes the stable output of inductive current and output voltage and reduces inductive current surge, through adjusting the reference value directly or indirectly during the power-up to enable it to rise from 0V to the final preset value within the preset start-up time. Taking the DC-DC switch power supply of current mode as an example, the vast majority of such chips involve the soft-start circuit for power-up, which can realize the stable output of the output voltage by controlling the reference value to rise from 0V to the final preset value within the preset time.

In addition, the output voltage can be controlled through the current limitation. On the one hand, in order to limit the maximum peak inductive current, the peak current threshold OCP is designed for each cycle. On the other hand, regarding the DC-DC control loop of current mode, the compensation threshold COMP controls the output current. The larger the output current, the larger the compensation threshold COMP. The maximum value of the outputted compensation threshold COMP which is allowed in the design, will be greater than the maximum output current which is preset by the chip. For example, when the chip allows the maximum output current of 1 A, the maximum value of the outputted compensation threshold COMP which is allowed in the design, may be about 1.5 A. In this way, the peak inductive current can be controlled through the both controls of the peak current threshold OCP and the compensation threshold COMP. The system automatically selects the minimum value from the peak currents which are limited by the peak current threshold OCP and the compensation threshold COMP. Generally, the peak current which is limited by the compensation threshold COMP is larger than that limited by the peak current threshold OCP. In order to satisfy the operation requirement of the system, both of the peak current threshold OCP and the compensation threshold COMP should be larger than the maximum load current allowed by the system. At the same time, the vast majority of chips have fixed the soft-start time in the design, that is, the time, which is costed by the reference value to rise from 0V to the final voltage, is fixed. Accordingly, the parameters of peripheral devices must be able to guarantee that the output voltage follows the internal reference value within the preset start-up time. Once the output voltage cannot follow the internal reference value, the inductive current operates at the minimum one of the peak currents which are limited by the peak current threshold OCP and the compensation threshold COMP, such that the inductive current operates at the maximum peak current of the system. For example, when the load capacitance is large, even if the chip operates at the maximum peak current, the output voltage may not follow the reference value. If the capacitance is large enough and the inductor operates at the maximum peak current for a long time, a risk of damage occurs at both the chip and the inductor.

SUMMARY

The present disclosure has provided a soft-start circuit for power-up, aiming at the above-mentioned defect that a risk of damage occurs when the chip operates at the maximum peak current for a long time.

According to an aspect, a soft-start circuit for power-up, is provided, which including:
 a reference value generation circuit, which is configured to output a reference value, which increases slowly, during a start-up process for power-up;
 a protection threshold generation circuit, which is configured to output a protection threshold, which increases slowly, during the start-up process for power-up;
 a control circuit, which is configured to control an output voltage to increase slowly along with the reference value based on the reference value, during the start-up process for power-up, and to limit an output current based on the protection threshold to limit the output voltage, during the start-up process for power-up.

Preferably, the soft-start circuit for power-up further includes a frequency modulation circuit, which is configured to monitor the output voltage, and generate a frequency signal, which is positively related with the output voltage, based on the output voltage, for the soft-start circuit for power-up.

Preferably, a slow increase rate of the reference value which is outputted by the reference value generation circuit, and/or a slow increase rate of the protection threshold which is outputted by the protection threshold generation circuit, are positively related with the frequency signal which is outputted by the frequency modulation circuit.

Preferably, the soft-start circuit for power-up further includes a start-up time detection circuit, which is configured to monitor the output voltage during the start-up process for power-up, to time with a frequency signal, to control the control circuit to maintain turning-on when the output voltage increases to a preset value within a first start-up time, and to control the control circuit to turn off when the output voltage fails to increase to the preset value within the first start-up time, to maintain timing and control the control circuit to turn on again when the timing reaches a second start-up time, and to control an output reset of the reference value generation circuit and an output reset of the protection threshold generation circuit through a reset signal, simultaneously; wherein the second start-up time is an integral multiple of the first start-up time.

Preferably, the reference value and the protection threshold have a linear increase, a stepwise increase, or a curvilinear increase.

Preferably, the protection threshold generation circuit is specifically configured to control a stepwise increase of the protection threshold based on the frequency signal, which is outputted by the frequency modulation circuit, during the start-up process for power-up; wherein a time step length of the stepwise increase is positively related with the frequency signal which is outputted by the frequency modulation circuit.

Preferably, the reference value generation circuit is specifically configured to control a stepwise increase of the reference value based on the frequency signal, which is outputted by the frequency modulation circuit, during the start-up process for power-up; wherein a time step length of the stepwise increase is positively related with the frequency signal which is outputted by the frequency modulation circuit.

Preferably, the soft-start circuit for power-up further includes a start-up time detection circuit, which is configured to monitor the output voltage during the start-up process for power-up, to time with the frequency signal which is generated by the frequency modulation circuit, to control the control circuit to maintain turning-on when the output voltage increases to a preset value within a first start-up time, and to control the control circuit to turn off when the output voltage fails to increase to the preset value within the first start-up time, to maintain timing and control the control circuit to turn on again when the timing reaches a second start-up time, and to control an output reset of the reference value generation circuit and an output reset of the protection threshold generation circuit through a reset signal, simultaneously; wherein the second start-up time is an integral multiple of the first start-up time.

Preferably, the protection threshold includes one or more protection thresholds, wherein the protection threshold, which has a minimum final-limited output current, has a stepwise increase.

Preferably, the protection threshold has multiple protection thresholds of both current values and voltage values.

Preferably, when the protection threshold, which has a minimum final-limited output current, is a current value; the protection threshold, which has a minimum final-limited output current, when comparing with the protection thresholds of the voltage value, has a stepwise increase;
wherein a step number of the protection threshold of the voltage value is greater than a step number of the protection threshold of the current value.

Preferably, the reference value is a voltage value, while the protection threshold is a current value or a voltage value which corresponds to the current value.

Preferably, the soft-start circuit for power-up includes a counting segmentation circuit or capacitor charge circuit which is configured to implement a slow increase of the voltage value.

Preferably, the capacitor charge circuit is specifically configured to output a slowly increased voltage through charge accumulation; or to generate a clock signal by using a frequency signal, and control cyclical charge storage and transfer according to the clock signal, and increase one gradient to its output voltage for each charge transfer.

Preferably, the counting segmentation circuit is specifically configured to perform a real-time count by using a frequency signal, and control its output voltage to increase one gradient and start a new round of count when each round of count reaches a target value.

Preferably, the soft-start circuit for power-up includes the soft-start circuit for power-up includes a counting segmentation circuit which is configured to implement a slow increase of the current value; or
the soft-start circuit for power-up includes a counting segmentation circuit or capacitor charge circuit which is configured to implement a slow increase of the voltage value, and a current mirror which configured to process an output of the slow increase of the voltage value to generate the slow increase of the current value.

Preferably, the capacitor charge circuit is specifically configured to output a slowly increased voltage through charge accumulation; or to generate a clock signal by using a frequency signal, and control cyclical charge storage and transfer according to the clock signal, and increase one gradient to its output voltage for each charge transfer.

Preferably, the counting segmentation circuit is specifically configured to perform a real-time count by using a frequency signal, and control its output current to increase one gradient and start a new round of count when each round of count reaches a target value.

Preferably, the frequency modulation circuit includes a first current source, a second current source, a first diode, a second diode, a voltage controlled current source, a first capacitor and an oscillator; wherein the voltage controlled current source is controlled by a difference between a preset voltage and the output voltage, an anode of the first diode is connected with an output terminal of the first current source and an anode of the second diode; a cathode of the first diode is connected with an output terminal of the second current source and a first end of the first capacitor, a cathode of the second diode is grounded through the voltage controlled current source; a second end of the first capacitor is grounded, and an input terminal of the oscillator is connected with the first end of the first capacitor; wherein the oscillator is configured to generate the frequency signal based on a preset frequency modulation reference voltage and a voltage at the first terminal of the first capacitor.

The soft-start circuit for power-up according to this disclosure has following technical effects. The reference value generation circuit of this disclosure is configured to output a reference value, which increases slowly, during a start-up process for power-up, such that the output voltage increases slowly along with the reference value, which enables the stable output of the output voltage. Meanwhile, the protection threshold generation circuit is configured to output a protection threshold, which increases slowly, during the start-up process for power-up. As the protection threshold increases slowly, its limited peak current increases slowly with the start-up progress. In this way, even if the output current must operate at the peak current, a smoother current output is realized, and operation at the maximum peak current for a long-time during start-up is not allowed, which greatly improves the risk of output current surge, and can ensure the stable output of the output voltage in the case of that the voltage follow, which is based on reference value, fails.

Furthermore, in this disclosure, a frequency modulation circuit is added to monitor the output voltage, which can generate a frequency signal positively related to the output voltage for the soft-start circuit for power-up. For example, the time step lengths of the stepwise increases of the reference value generation circuit and the protection threshold generation circuit, are positively related with the frequency signal which is outputted by the frequency modulation circuit. In this way, cooperating the modulation for the frequency signal through the output voltage with the slow increases of the reference value and the protection threshold, the average output current at this time can be limited and the risk of chip damage can be reduced, when the output voltage is small at the initial stage of start-up. Especially in abnormal circumstances, such as output short circuit, the average output current can be reduced by reducing the operation frequency, which can greatly improve the system reliability.

Furthermore, in this disclosure, a start-up time detection circuit is added. When the output voltage cannot reach the preset value for a long time due to excessive load capacitance or output short circuit, the control circuit is turned off to avoid damage which is caused by operation at the peak current for a long time.

BRIEF DESCRIPTION OF THE DRAWINGS

In order to illustrate the embodiments of the present disclosure or the technical solutions in the prior art more clearly, the drawings needed in the description of the embodiments or the prior art will be briefly introduced. It is obvious that the drawings in the following description are only the embodiments of the present disclosure, and for one skilled in the art, other drawings can be obtained from the following attached drawings without paying creative labor.

DETAILED DESCRIPTION OF THE PREFERRED EMBODIMENT

Figure 1:
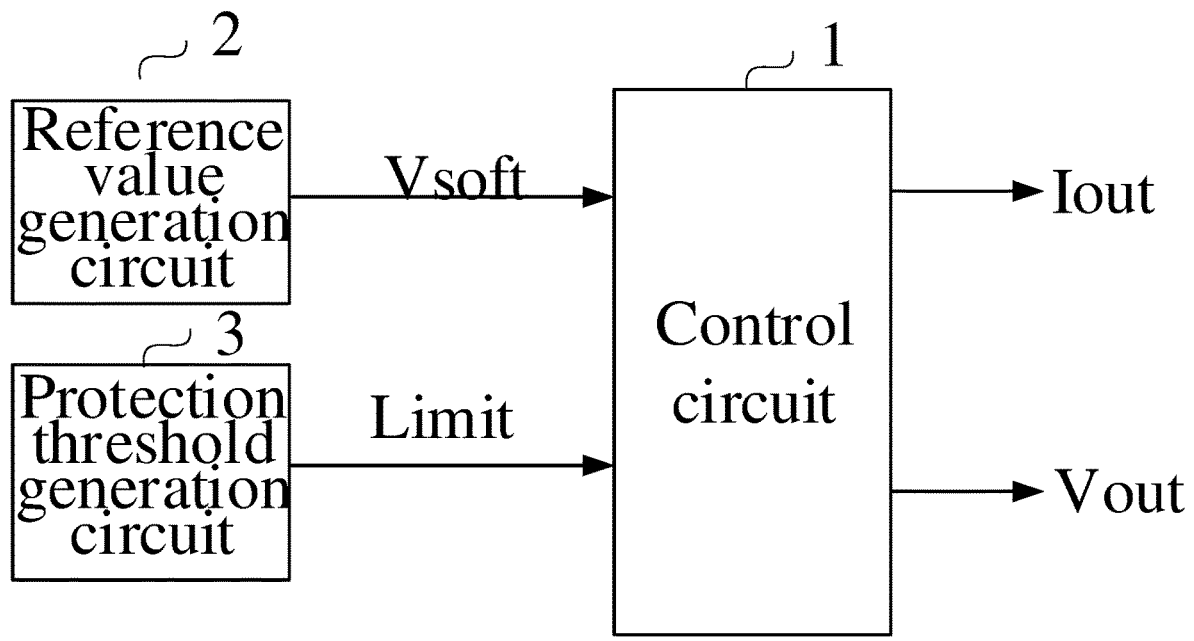
FIG. 1 is a structural diagram of a soft-start circuit for power-up according to a first embodiment of this disclosure.

In order to solve the technical problem that a risk of damage occurs when the chip operates at the maximum peak current for a long time, the present disclosure has provided a soft-start circuit for power-up. In which, the reference value generation circuit is configured to output a reference value, which increases slowly, during a start-up process for power-up, such that the output voltage increases slowly along with the reference value, which enables the stable output of the output voltage. Meanwhile, the protection threshold generation circuit is configured to output a protection threshold, which increases slowly, during the start-up process for power-up. As the protection threshold increases slowly, its limited peak current increases slowly with the start-up progress. In this way, even if the output current must operate at the peak current, a smoother current output is realized, and operation at the maximum peak current for a long-time during start-up is not allowed, which greatly improves the risk of output current surge, and can ensure the stable output of the output voltage in the case of that the voltage follow, which is based on reference value, fails.

In order to facilitate the understanding of the present disclosure, a more comprehensive description of the present disclosure will be given as follows with reference to the relevant drawings. Typical embodiments of the present disclosure are shown in the drawings. However, the present disclosure can be implemented in many different forms and is not limited to the embodiments described herein. On the contrary, the purpose of providing these embodiments is to make the description of the present disclosure more thorough and comprehensive.

Unless otherwise defined, all technical and scientific terms used herein have the same meanings as those commonly understood by one skilled in the art of the present disclosure. The terms used in the description of the present disclosure are only for the purpose of describing specific embodiments, and are not intended to limit the present disclosure.

The terms "first", "second" and other ordinal numbers used in this specification can be used to describe but not limit the various constituent elements. The purpose of using these terms is to distinguish one constituent element from the other. For example, without departing from the scope of the present disclosure, the first constituent element can be named as the second constituent element, and similarly, the second constituent element can also be named as the first constituent element. The "connect with" or "connect to" mentioned herein not only includes the direct connection of two entities, but also includes the indirect connection through other entities with beneficial improvement effect.

In this disclosure, the technical term "increase slowly", "slow increase", their variant, or similar expressions, mean that the increasing time can be maintained in millisecond level. For example, the increasing time in a preferable embodiment is designed as between 1-10 ms, preferably in 1-5 ms, and more preferably in 1-2 ms. Of course, the specific value of the increasing time can be shorter or longer according to the actual requirement and specific circuit design.

In order to better understand the above technical scheme, the above technical scheme will be described in detail in combination with the drawings of the specification and the specific embodiments. It should be understood that the embodiment of the present disclosure and the specific features in the embodiment are the detailed description of the technical scheme of the present disclosure, not the limitation of the technical scheme of the present disclosure. In the case of no conflict, the embodiment of the present disclosure and the technical features in the embodiment can be combined with each other.

First Embodiment

The soft-start circuit for power-up of this embodiment, can be applied to reduce a surge of an output current when a switch power supply is powered up. The switch power supply can be a DC-DC switch power supply or AC-DC switch power supply.

Referring FIG. 1, the soft-start circuit for power-up of this embodiment includes a reference value generation circuit 2, a protection threshold generation circuit 3 and a control circuit 1. The reference value generation circuit 2 is configured to output a reference value Vsoft, which increases slowly, during a start-up process for power-up. The protection threshold generation circuit 3 is configured to output a protection threshold Limit, which increases slowly, during the start-up process for power-up. The control circuit 1 is configured to control an output voltage Vout to increase slowly along with the reference value Vsoft based on the reference value Vsoft, during the start-up process for power-up, and to limit the output current Iout based on the protection threshold Limit to limit the output voltage Vout, during the start-up process for power-up.

Taking the application scenario of switch power supply as an example, the operation principle of reference value and protection threshold are introduced below.

Function principle of the reference value Vsoft is as follows. After the circuit is started up, the reference value Vsoft is eventually maintained at a stable value (such as Vsoft_set shown in FIG. 6 and FIG. 12). In the normal operation process after startup, the final stable value (Vsoft_set) of the reference value Vsoft will be used to operate. For example, in the normal operation process after startup of switch power supply, the switch power supply samples the output voltage, compares the sampled result with the stable reference value Vsoft_set, and then controls relevant switches which control the output voltage, according to the comparison results, thus enabling the output voltage to follow the stable reference value Vsoft_set. In such a way, the output voltage stabilizes at the required voltage Vout_set. Accordingly, through setting the appropriate stable reference value Vsoft_set, the final output voltage can be guaranteed to reach the required voltage Vout_set. Therefore, during the startup of switch power supply, in order to control the output voltage to slowly increase to the required voltage Vout_set, the reference value Vsoft can be controlled to increase slowly to realize the slow increase of the output voltage along with the slow increase of reference value Vsoft. Finally, when the reference value Vsoft reaches the appropriate stable reference value Vsoft_set and maintains stable, the output voltage increases slowly along with the reference value Vsoft to the required voltage Vout_set and maintains stable. In addition, the expression "along with", which may be expressed as "follow" herein or in the context of the application, emphasizes a trend, not necessarily means that the gradient of the output voltage is completely equal to that of the reference value Vsoft, because the sampling of the output voltage is not necessarily a one-to-one sampling.

Figure 6:
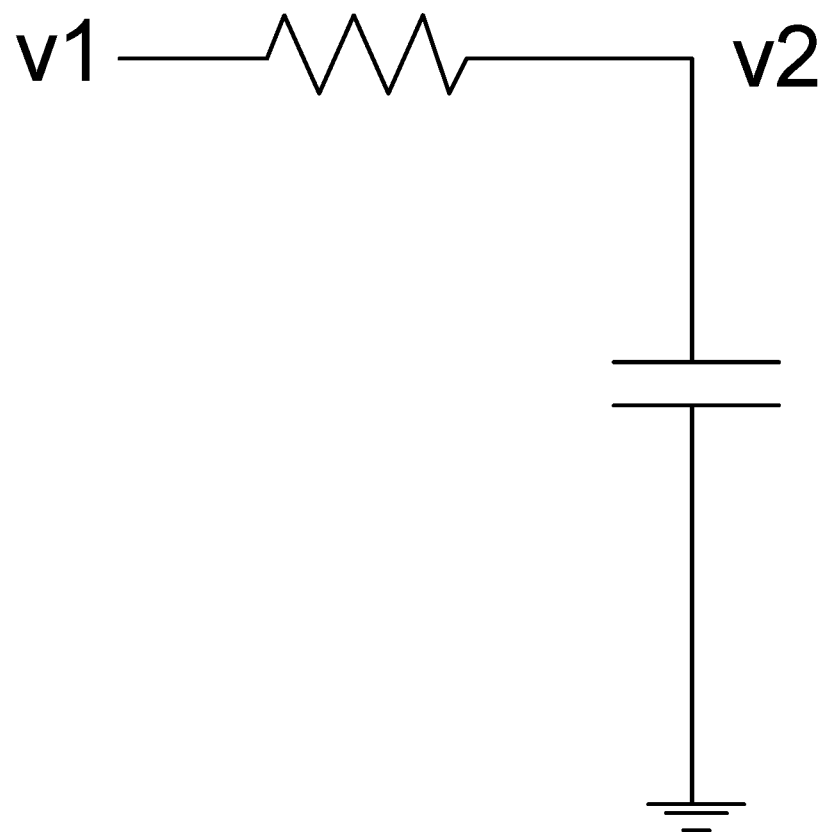
FIG. 6 is a circuit schematic diagram of an RC circuit.
Figure 12:
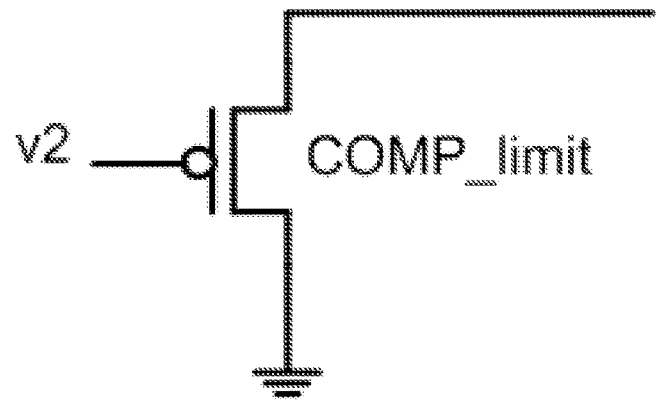
FIG. 12 is a schematic diagram of a first specific implementation mode of protection threshold multiplexing reference value in a voltage form.

Function principle of the protection threshold Limit is as follows. After the circuit is started up, the protection threshold Limit is eventually maintained at a stable value (such as OCP_set and COMP_set which are shown in FIG. 6 and FIG. 12). In the normal operation process after startup, the final stable value (OCP_set and COMP_set) of the protection threshold is used to limit the output current and enable the output current not to exceed a preset maximum peak current during the normal operation process after startup. In the prior art, the protection threshold limit is fixed (such as COMP and OCP in FIG. 6), which specifically corresponds to the maximum peak current. Therefore, when the output current needs to operate at the maximum peak current of the system during the startup of the switch power supply, it operates according to the maximum peak current during the normal operation. In this embodiment, in the startup of the switch power supply, the protection threshold does not always correspond to the maximum peak current during the whole normal operation process, but increases slowly during the whole startup process (such as OCP_limit and COMP_limit in FIG. 6 and FIG. 12). Accordingly, the peak current, which is limited by the protection threshold, also increases slowly. Therefore, even if the output current must operate at the peak current, a smoother current output is realized, and operation at the maximum peak current for a long-time during start-up is not allowed, which greatly improves the risk of output current surge, and can ensure the stable output of the output voltage in the case of that the voltage follow, which is based on reference value, fails.

It can be understood that the protection threshold which is outputted by the protection threshold generation circuit 3 can include one or more protection thresholds and this is determined by the circuit to which the soft-start circuit for power-up is applied. For example, if the soft-start circuit for power-up of this disclosure is applied to the DC-DC switch power supply of current mode, there are two peak currents (the peak current which is allowed by the peak current threshold OCP and the peak current allowed by the compensation threshold COMP), so there are two protection thresholds (such as voltages OCP_limit and COMP_limit).

There are many slow increase manners for the reference value Vsoft and the protection threshold Limit. For example, the reference value Vsoft and the protection threshold Limit can have a linear increase, a stepwise increase, or a curvilinear increase. Preferably, the reference value Vsoft and the protection threshold Limit employ a stepwise increase. The final reference value Vsoft and the final protection threshold Limit are maintained at a stable value. In the normal operation process after startup, the final stable value achieved by the protection threshold limit and the reference value Vsoft is used for operation.

Preferably, when there are multiple protection thresholds Limit, just the protection threshold Limit, which has the minimum final-limited output current, is selected to have a stepwise increase. While the other protection thresholds Limit can have a stepwise increase or can have a fixed amplitude as that in the previous manner. The step numbers of the stepwise increases of different protection thresholds Limit, can be the same or different.

Furthermore, when there are multiple protection thresholds Limit of both current value and voltage value; if the protection threshold Limit, which has the minimum final-limited output current Tout, after the circuit startup, is a current value, then the protection threshold Limit of the voltage value, which has a minimum final-limited output current Tout, when comparing with the protection thresholds Limit of the voltage value, is selected to have a stepwise increase. This is because the stepwise increase implementation scheme of the current threshold is relatively complex compared with the stepwise increase implementation scheme of the voltage threshold. In order to better realize the protection function, an increase step of the protection threshold Limit of the voltage value is smaller than an increase step of the protection threshold Limit of the current value. Accordingly, a step number of the protection threshold Limit of the voltage value is greater than a step number of the protection threshold Limit of the current value.

For example, if the protection thresholds Limit comprises current thresholds I1_limit, I2_limit and voltage thresholds v1_limit, v2_limit, and all the current and voltage thresholds can limit the output current. Supposing that the protection threshold, which has a minimum final-limited output current Tout, is current threshold I1_limit. The voltage threshold, which is in the voltage thresholds v1_limit and v2_limit and has a relatively small final-limited output current, is voltage threshold v1_limit. Accordingly, both of the current threshold I1_limit and the voltage threshold v1_limit are selected to have a stepwise increase, and the step number of the voltage threshold v1_limit is far greater than the step number of the current threshold I1_limit. Regarding the implementation difficulty, current threshold I1_limit should not be divided into too many steps, while the voltage threshold v1_limit can be divided into as many steps as possible. In such a way, the output current is limited through the voltage threshold v1_limit in the early stage of the startup process, while the output current is limited through the current threshold I1_limit finally. For example, referring to FIGS. 6 and 12 and taking the DC-DC switch power supply of current mode as an example, OCP_limit is the protection threshold in the form of current (that is, the current threshold), COMP_limit is the protection threshold in the form of voltage (that is, the voltage threshold). The output current which is finally limited by current threshold OCP_limit is smaller than the output current which is finally limited by voltage threshold COMP_limit. The current threshold OCP_limit and the voltage threshold COMP_limit are both outputted in a stepwise increase manner. However, the current threshold OCP_limit is designed to have three steps while the voltage threshold COMP_limit is designed to have far more steps than the current threshold OCP_limit. Accordingly, during the early stage of the startup process, the voltage threshold COMP_limit is smaller than the current threshold OCP_limit and mainly functions. However, during the later stage of the startup process and after the startup process, the voltage threshold COMP_limit is greater than the current threshold OCP_limit, so the current threshold OCP_limit mainly functions. In the normal operation process after startup, the stabilized current threshold OCP_limit mainly functions.

The circuit implementation is as follows.

Control circuit 1 refers to any circuit that needs to be regulated during power-on and start-up, and is not specially designated. For description convenience, the commonly used DC-DC switch power supply of current mode is taken as an example, and its output signals Vout and IL are only used as control parameters of a DC-DC control circuit.

The reference value generation circuit 2 can be a counting segmentation circuit or capacitor charge circuit for implementing its function when the reference value Vsoft is in the form of voltage value.

The protection threshold generation circuit 3 can be a counting segmentation circuit or switch capacitor circuit for implementing its function when the protection threshold Limit is in the form of a voltage value which corresponds to a current value (such as COMP_limit). At this time, the implementation mode of the protection threshold generation circuit 3 can refer to the reference value generation circuit 2, or even multiplex the output of the reference value generation circuit 2. The protection threshold generation circuit 3 can be a counting segmentation circuit for implementing its function when the protection threshold Limit is in the form of a current value (such as OCP_limit). Alternatively, the protection threshold generation circuit 3 can use the output in the form of slowly increasing voltage value (such as reference value Vsoft or COMP_limit) to output after current mirroring, for implementing its function when the protection threshold Limit is in the form of a current value (such as OCP_limit).

Specifically, the capacitor charge circuit is configured to output a slowly increased voltage through charge accumulation; or to generate a clock signal by using the frequency signal, and control cyclical charge storage and transfer according to the clock signal, and increase one gradient to an output voltage Vout for each charge transfer.

Four kinds of capacitor charge circuits are introduced below.

The first one is a switch capacitor circuit which uses the frequency signal to generate a clock signal, controls cyclical charge storage and transfer according to the clock signal, and increase one gradient to an output voltage for each charge transfer.

Figure 2:
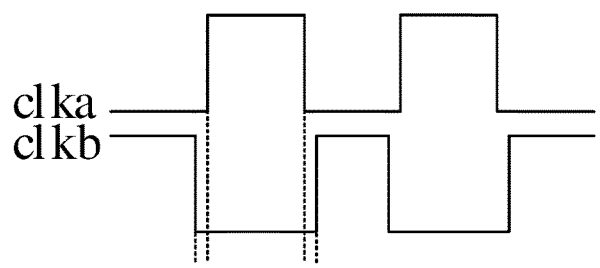
FIG. 2 is a circuit schematic diagram of a switch capacitor circuit.
Figure 2:
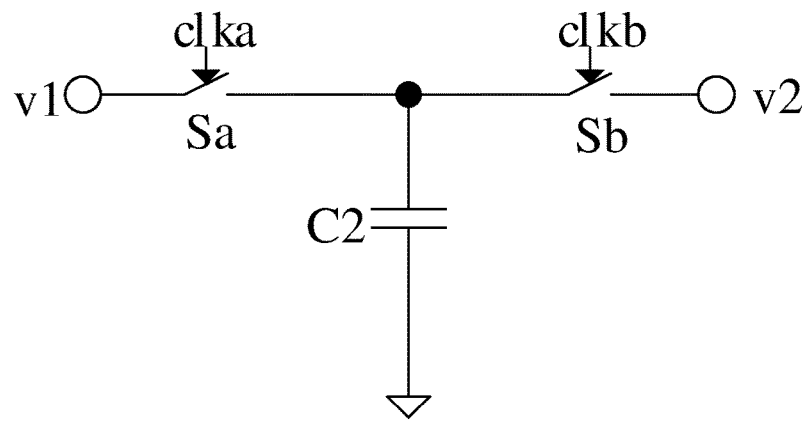

Referring to FIG. 2, a feasible implementation scheme of switch capacitor circuit is given. The switch capacitor circuit includes a first switch Sa, a second switch Sb and an intermediate capacitor C2. A first end of the intermediate capacitor C2 is connected to a fixed voltage v1 through the first switch Sa and outputs charges through the second switch Sb. A second end of the intermediate capacitor C2 is grounded. If the second switch Sb wants to output voltage (such as the reference value Vsoft or the protection threshold COMP_limit in the form of voltage), a capacitor C3 should be followed.

Among them, the first switch Sa and the second switch Sb are logic switches, which are turned on at a high level and turned off at a low level. The first switch Sa is controlled by a first switch signal clka, and the second switch Sb is controlled by a second switch signal clkb. The first switching signal clka and the second switching signal clkb are two non-overlapping clock signals with a cycle of Tclk, which can be generated from the frequency signal through sequential logic circuit, combinational logic circuit and time delay circuit. For example, you can divide the frequency signal and send it to the relevant circuit to change the duty cycle to obtain a clock signal, and then obtain another clock signal by inverting and delaying the clock signal.

Because the first switch signal clka and the second switch signal clkb are two non-overlapping clock signals, the first switch Sa and the second switch Sb cannot be turned on at the same time. Therefore, when voltage v1 and voltage v2 are not equivalent, one charge package, which has a charge amount equal to a difference between the charge amount q1 and the charge amount q2 in each cycle, and the difference can be expressed as:

$$q_1 - q_2 \doteq C(v_1 - v_2) \quad (1)$$

Figure 4:
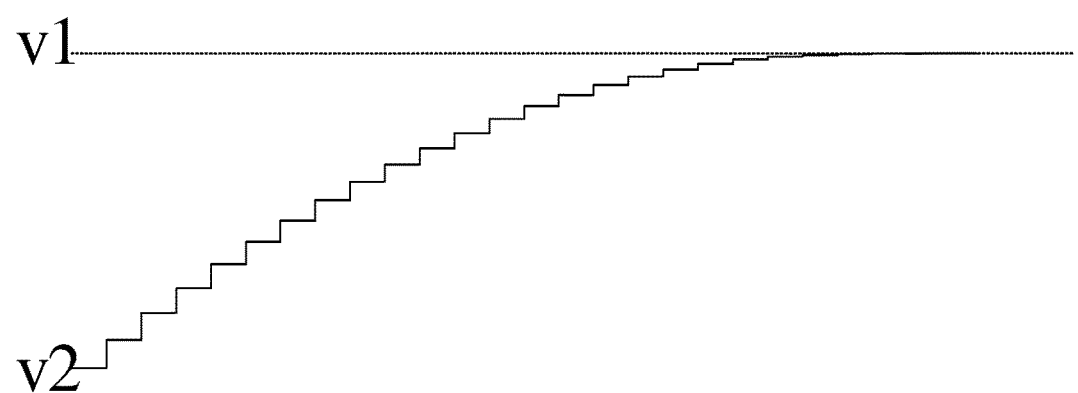
FIG. 4 is a first output diagram of a switch capacitor circuit.

The specific principle of voltage gradient increase is as follows. Assuming that a capacitor C3 is also provided at the voltage v2. As shown in FIG. 4, the fixed voltage v1 has a stable amplitude, and the voltage v2 is equal to 0V at the beginning. In the first cycle Tclk, when the first switch Sa is turned on, the voltage v1 is transferred to the intermediate capacitor C2 (i.e., charge storage). When the second switch Sb is turned on, the voltage on the capacitor C2 is averagely distributed (i.e., charge transfer) to the two capacitors C2 and C3. In the second cycle Tclk, when the first switch Sa is turned on again, the intermediate capacitor C2 is charged to the voltage v1 again. When the second switch Sb is turned on again, the voltages on capacitors C2 and C3 are averagely distributed again, and the voltage on capacitor C3 increases by one gradient. By analogy, in each cycle, the voltage on capacitor C3 increases by one gradient and the voltage v2 will eventually be equal to the voltage v1. Therefore, the value of the voltage v1 can be set according to the final value of the required output voltage, such as the final stable value Vsoft_set of the reference value Vsoft_limit, or the final stable value COMP_set of the protection threshold in the form of voltage COMP_limit.

If the voltages v1 and v2 change very slowly compared with the clock cycle Tclk, the average current transmitted in the clock cycle Tclk is:

$$I_{avg} = \frac{C(v_1 - v_2)}{T_{clk}} = \frac{(v_1 - v_2)}{R_{sc}}. \quad (2)$$

Figure 3:
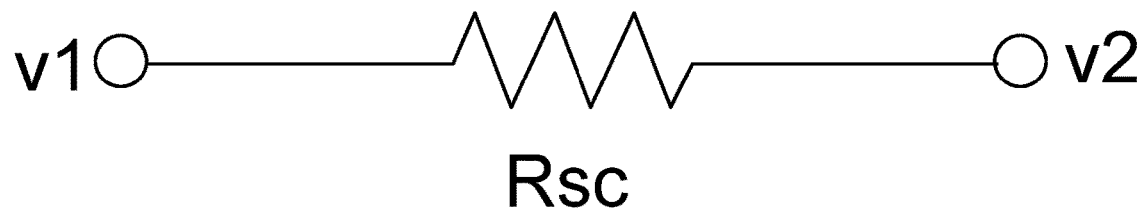
FIG. 3 is an equivalent diagram of a switch capacitor circuit.

Wherein, Rsc is an equivalent resistance of the switch capacitor circuit. As shown in FIG. 3, the equivalent resistance Rsc of the obtained switch capacitor circuit is:

$$R_{SC} = \frac{T_{clk}}{C}. \quad (3)$$

This formula can reflect the increase speed of the voltage (such as Vsoft, COMP_limit) which has a stepwise increase and is outputted by the switch capacitor circuit. The larger the Rsc is, the slower the voltage increases. Therefore, different voltage increase curves can be realized by adjusting the clock cycle Tclk.

Figure 5:
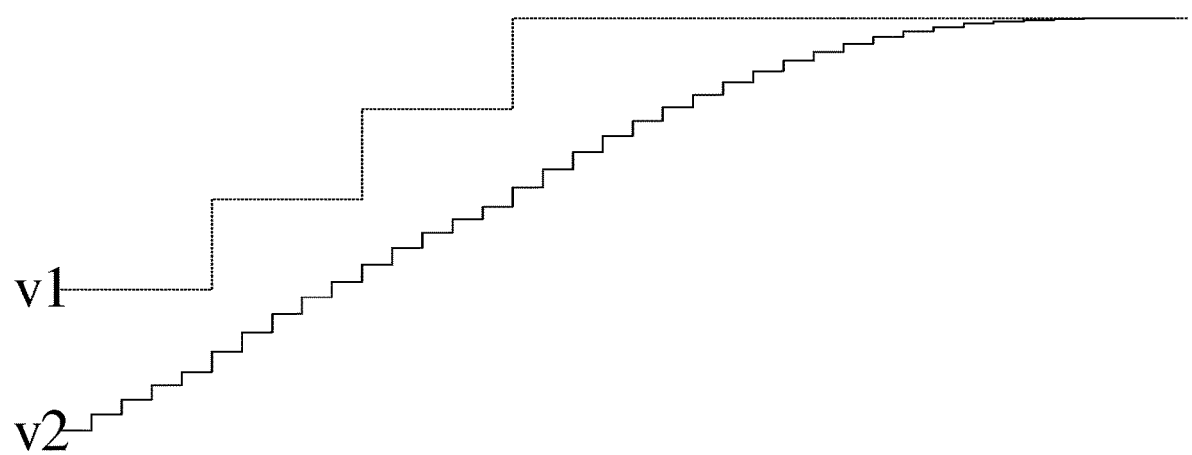
FIG. 5 is a second output diagram of a switch capacitor circuit.

In order to obtain a more ideal voltage curve with stepwise increase, the fixed voltage v1 can be divided to obtain a smooth start current. As shown in FIG. 5, the fixed voltage v1 is a voltage with stepwise increase. Specifically, the voltage v1 is divided into four-step output, and the step number of voltage v1 can be increased or decreased appropriately according to different requirements.

It can be understood that the circuit shown in FIG. 2 is an ideal switch capacitor circuit, and its function realization mode is not limited to that shown in FIG. 2, and this function can be implemented through a variety of circuit structures.

Figure 7:
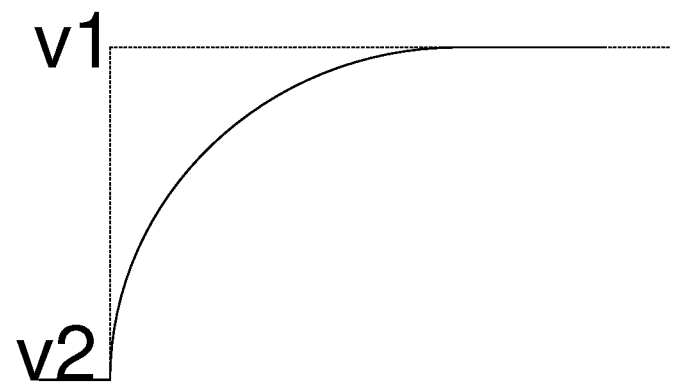
FIG. 7 is an output diagram of an RC circuit.

The second one is ordinary RC circuit. Referring FIGS. 6-7, the voltages v1 and v2 represent input and output, respectively. In this case, the output voltage increases slowly in a curve mode.

Figure 8:
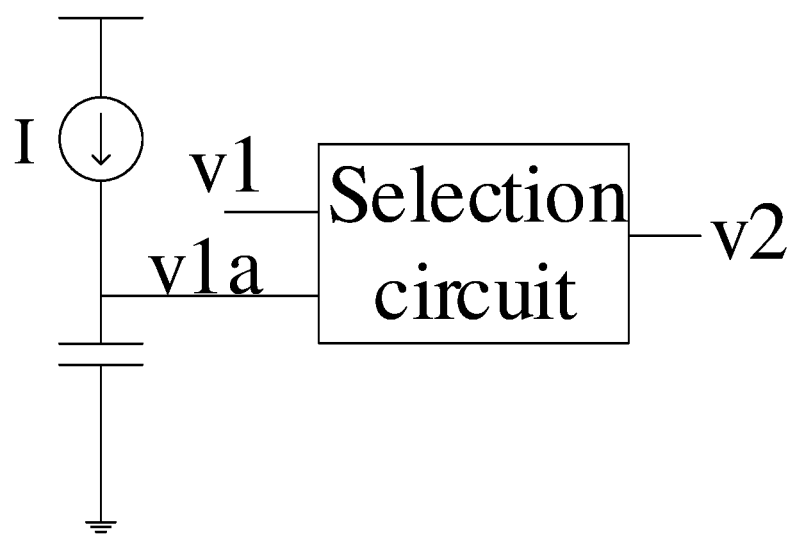
FIG. 8 is a circuit schematic diagram of a capacitor linear charge circuit.
Figure 9:
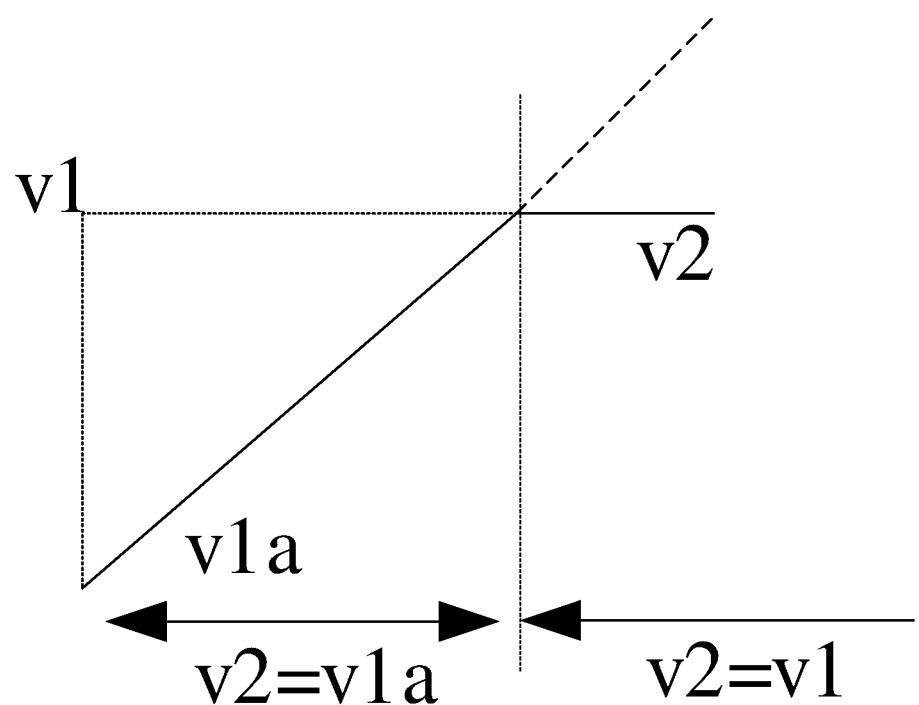
FIG. 9 is an output diagram of a capacitor linear charge circuit.

The third one is a capacitor linear charge circuit. Referring FIGS. 8-9, the voltages v1 and v2 represent input and output, respectively. In this case, a current source is directly used to charge the capacitor, and a selection circuit compares voltage v1 with voltage v1a on the capacitor and selects the smaller one to output. In this case, the output voltage increases slowly in a linear mode.

Figure 10:
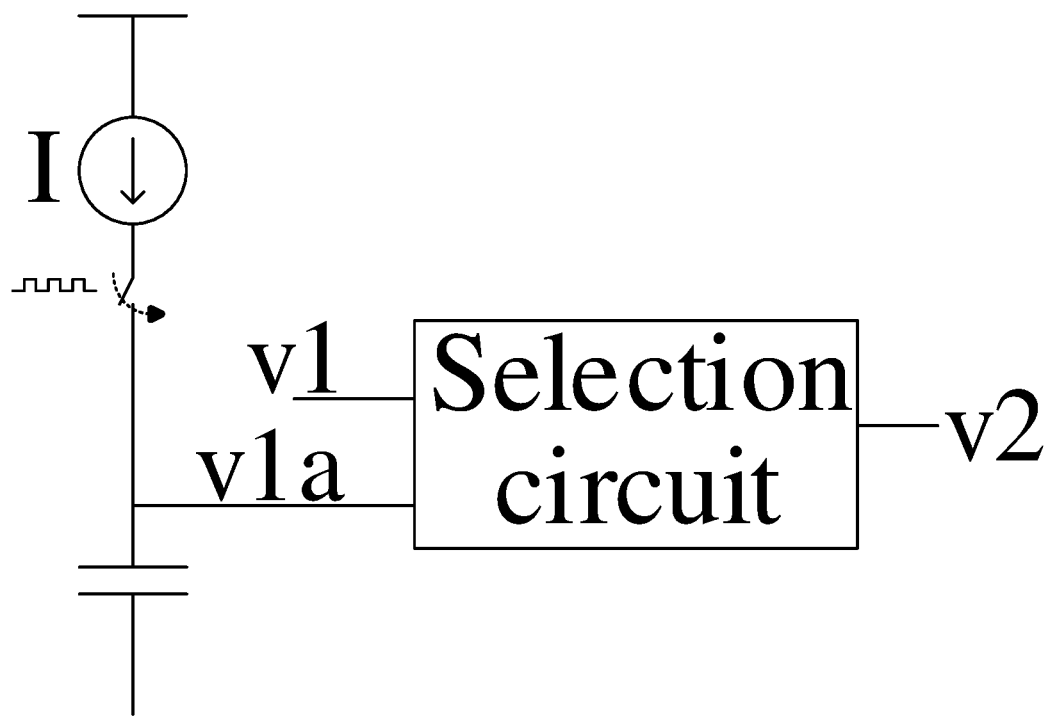
FIG. 10 is a circuit schematic diagram of a capacitor pulse charge circuit.
Figure 11:
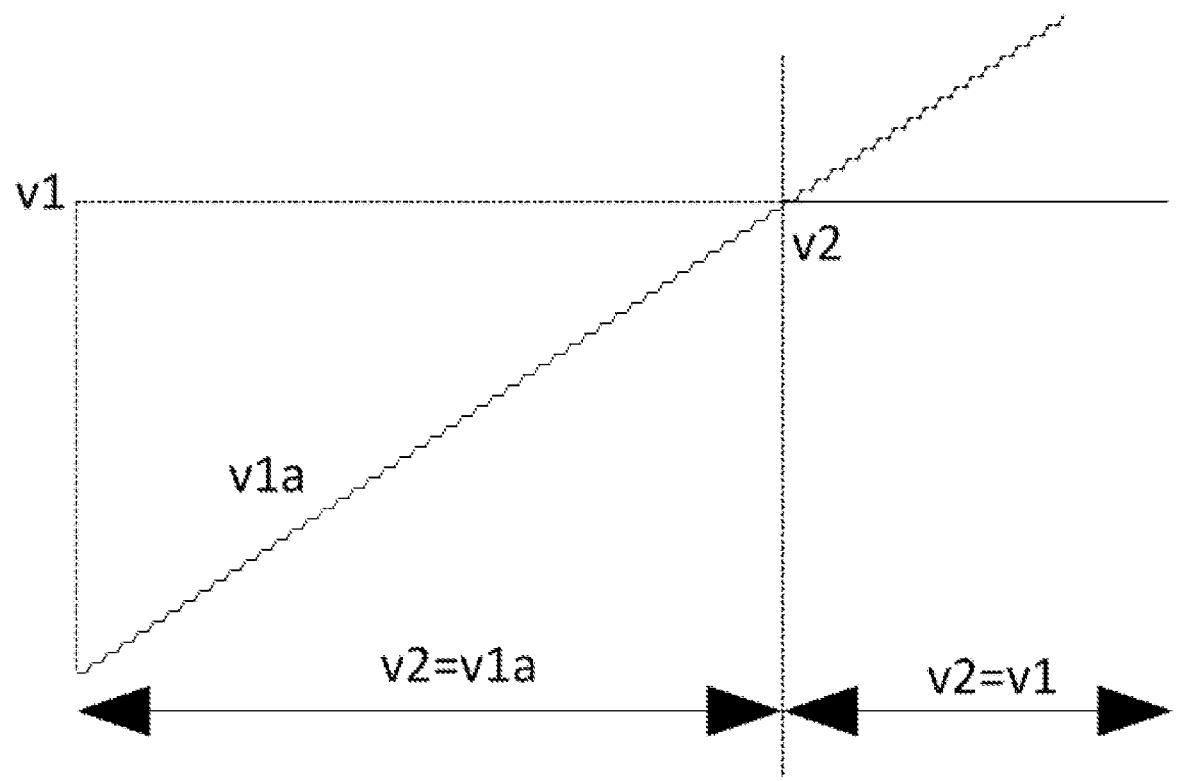
FIG. 11 is an output diagram of a capacitor pulse charge circuit.

The fourth one is a capacitor pulse charge circuit. Referring FIGS. 10-11, the voltages v1 and v2 also represent input and output, respectively. In this case, a switch is added on the basis of FIG. 8, and the switch is controlled by the clock signal. In this case, the increase gradient of the output voltage is very small, so the output voltage is close to a linear mode.

Figure 13:
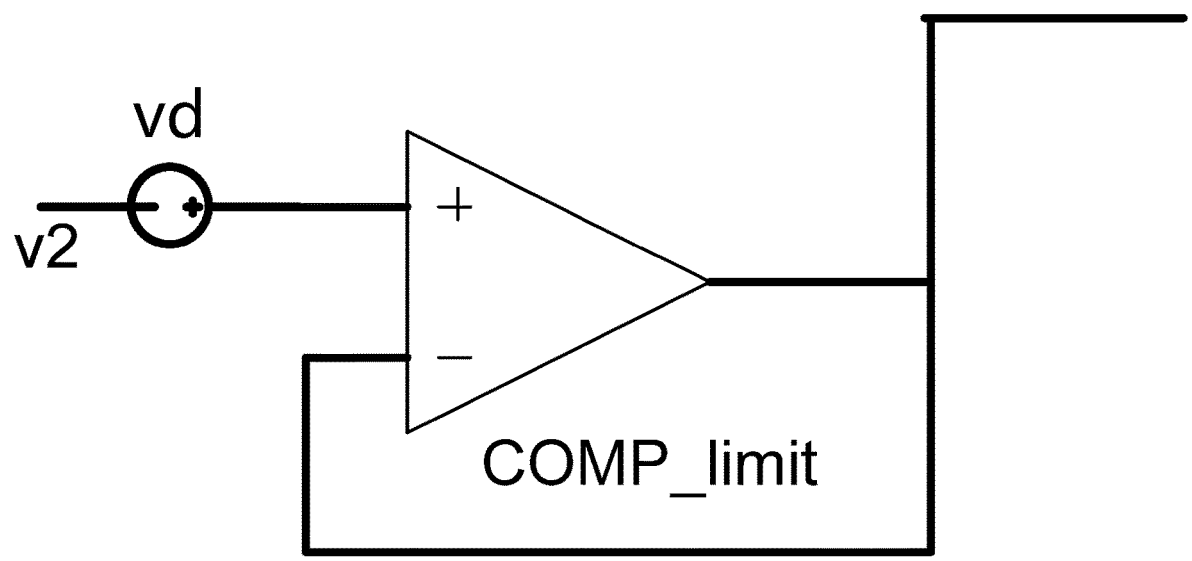
FIG. 13 is a schematic diagram of a second specific implementation mode of protection threshold multiplexing reference value in a voltage form.

In addition, in order to simplify the circuit and save cost, the protection threshold COMP_limit in the form of voltage value in the present embodiment can no longer be obtained by redesigning the circuit. It is recommended to multiplex the reference value Vsoft. Referring to FIGS. 12 and 13, two ways of multiplexing the reference value Vsoft are given. The voltage v2 is the reference value Vsoft. FIG. 12 shows that the slowly increased voltage COMP_limit is obtained by voltage Vgs of the PMOS tube plus the slowly increased voltage v2. FIG. 13 shows that the slowly increased voltage COMP_limit is generated by an operational amplifier which received the slowly increased voltage v2 plus a stable voltage Vd whose value depends on the circuit requirements.

Specifically, the counting segmentation circuit is configured to perform a real-time counting by using a currently received frequency signal, and control its output current/output voltage to increase one gradient and start a new round of counting when each round of counting reaches a target value.

Taking the DC-DC switch power supply of current mode as an example again, the counting segmentation circuit counts based on the frequency signal. Assuming that, the current threshold OCP_limit needs to count N1 rounds, wherein each round counts N11 times. That is, each step counts from 1 to N11. The voltage threshold COMP_limit needs to count N2 rounds, wherein each round counts N22 times. That is, each step counts from 1 to N22. If N2 is greater than N1, N22 is smaller than N11. After the power-on and start-up process, the counting segmentation circuit can control the current threshold OCP_limit to start as OCP_set/N1, and the voltage threshold COMP_limit to start as COMP_set/N2, wherein OCP_set and COMP_set are the finally stabilized value of the current threshold OCP_limit and the voltage threshold COMP_limit, respectively. At first, COMP_set/N2 is less than OCP_set/N1, so the COMP_set/N2 functions. When the count reaches N22 after the start-up, the voltage threshold COMP_limit increases to 2*COMP/N2. If the count reaches 2*N22, the voltage threshold COMP_limit increases to 3*COMP/N2, and so on. The increase process of the current threshold OCP_limit is the same. The current threshold OCP_limit controls the peak current threshold OCP of the control circuit 1, while the voltage threshold COMP_limit controls the compensation threshold COMP of the control circuit 1. The function of the counting segmentation circuit can be realized in a variety of circuit ways through the integration of sequential logic circuit, combinational logic circuit and other circuits. For example, the count function can be realized by using an independent counter or a counter integrated inside the controller. For another example, the function of adding one gradient to the voltage value/current value can be realized through the cooperation of multiple voltages and multiple switches, For example, when switching a switch, the voltage or current will be switched/superimposed for once. Therefore, this implementation method will be more complex than the switch capacitor circuit. If the stepwise increase is adopted, the step number is too large and the implementation cost is high. Therefore, it is suggested that the stepwise increase of the protection threshold in the form of voltage is preferably realized by the switch capacitor circuit.

Figure 14:
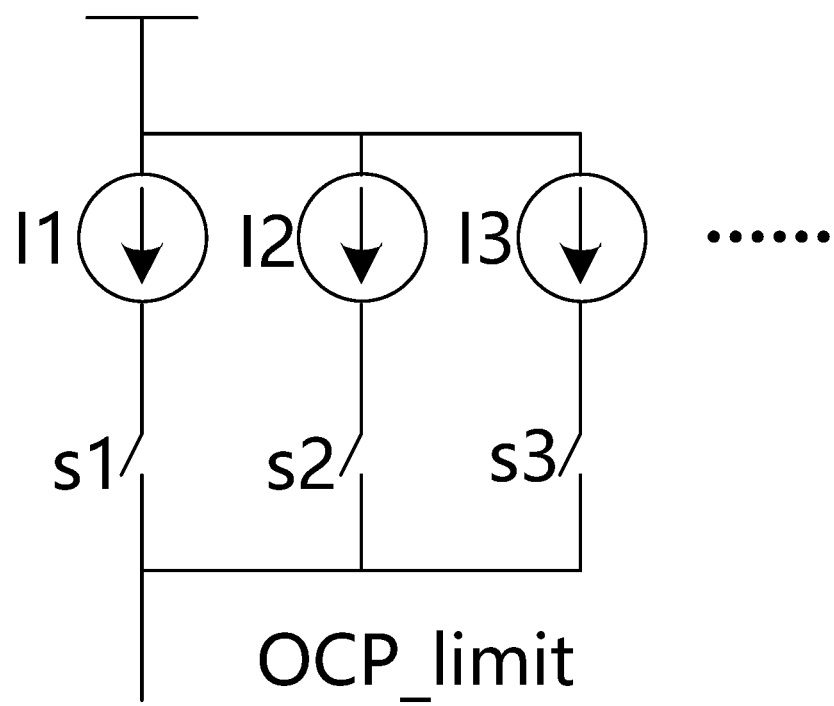
FIG. 14 is a schematic diagram of a counting segmentation circuit of a protection threshold in an output current value form.

For example, referring to FIG. 14, I1, I2, I3, . . . , represent multiple current sources with the same size. If the current threshold OCP_limit with stepwise increase is to be generated, the switches of the current sources I1, I2, I3 can be switched on sequentially, in cooperate with the counter, to realize the sequential superposition of current. Of course, if the current sources I1, I2, I3 are replaced by the voltages with sequential increase amplitude, each switch can be switched on and/or off sequentially to switch each voltage, in cooperate with the counter. Of course, multiple voltages of the same value, which are connected in series, can be designed, and the voltage superposition can be realized by controlling the switches to be switched on sequentially.

Figure 15:
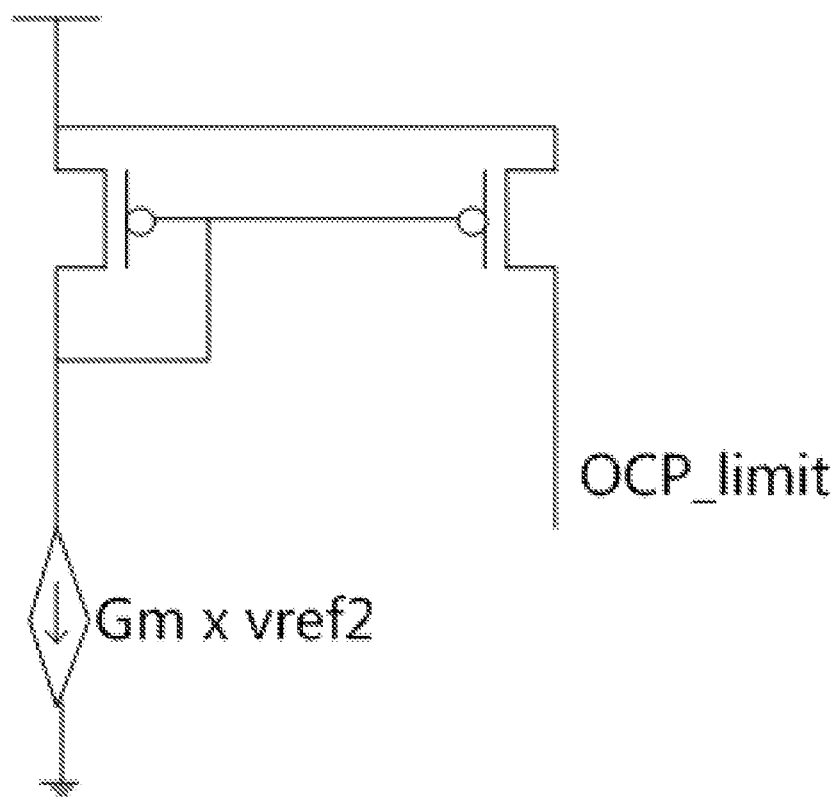
FIG. 15 is a schematic diagram of an implementation of a protection threshold multiplexing reference value in an output current value form.

The above counting segmentation circuit is suitable for the demand of stepwise increase. In order to realize the slow increase of other forms of current output, a current mirror output of the slow increase of the voltage value can be employed. Referring to FIG. 15, Vref2 can also be another slowly increased voltage which is generated separately, or can be obtained through multiplexing the previous voltage v2 or the reference value Vsoft to control the voltage controlled current source, and then outputting the current threshold OCP_limit through the current mirror.

Figure 16:
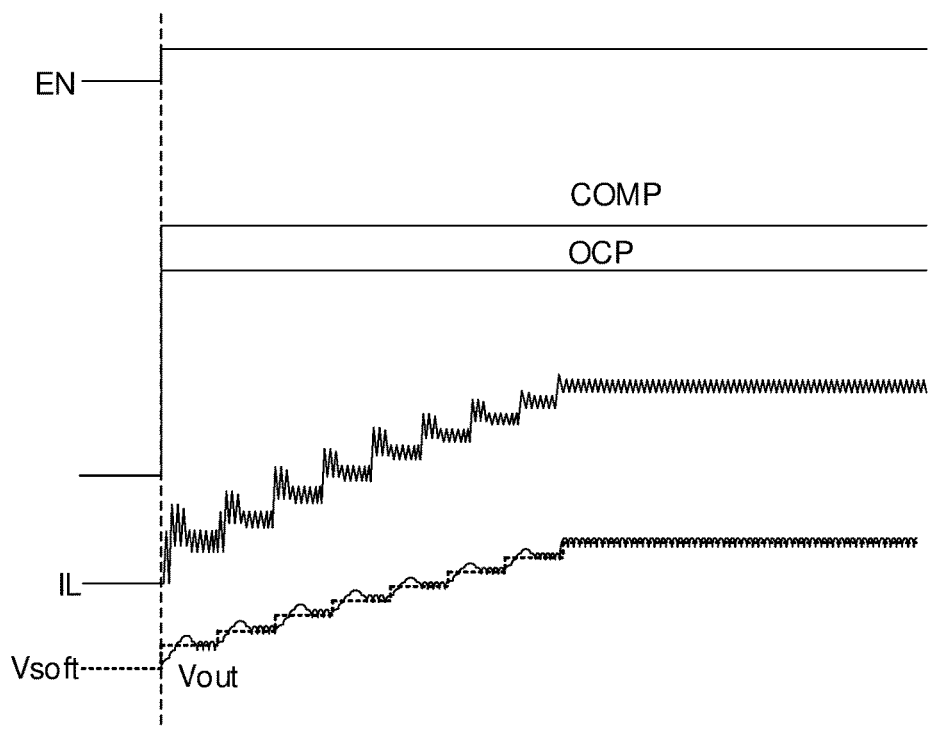
FIG. 16 is a comparison diagram between an existing soft-start output waveform for power-up and soft-start output waveform for power-up of the first embodiment.
Figure 16:
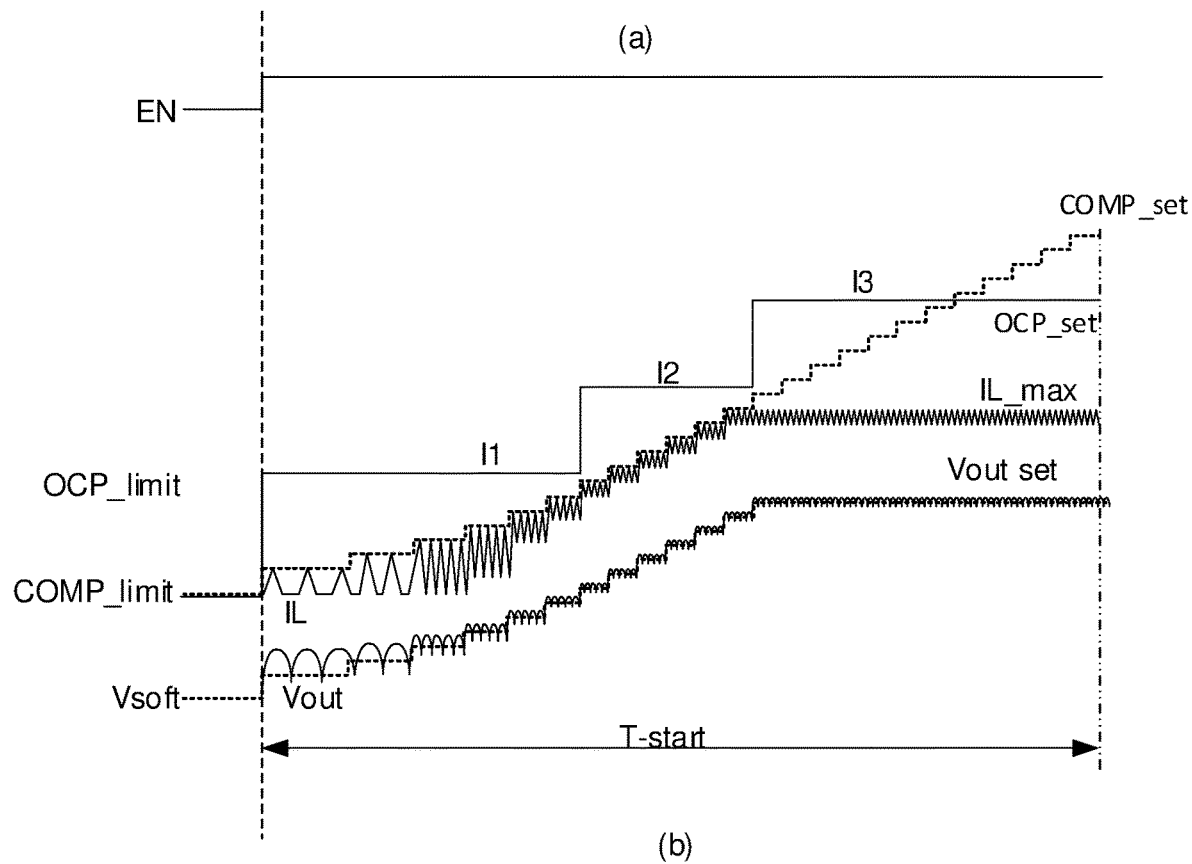
Figure 17:
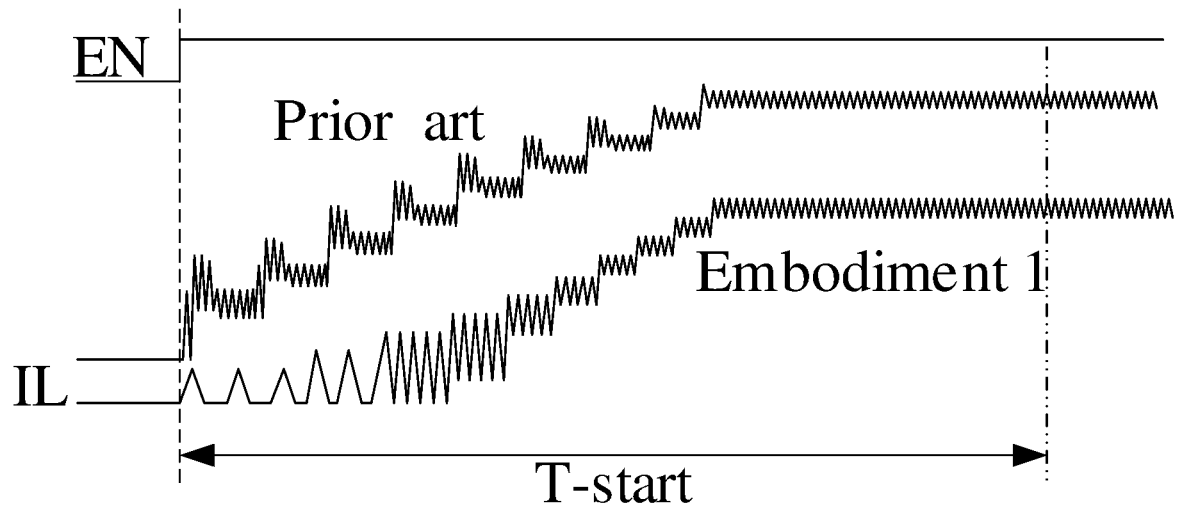
FIG. 17 is an inductive current comparison diagram between an existing soft-start for power-up and a soft-start for power-up of the first embodiment.

For example, take the DC-DC switch power supply of current mode as an example, to demonstrate the technical effect of this embodiment. If a traditional soft-start circuit is adopted, the schematic diagram of output voltage Vout and inductive current IL is shown in (a) of FIG. 16. Since the peak current threshold OCP and the compensation threshold COMP are not limited during start-up, the peak value of current IL depends on the minimum value of the peak current threshold OCP and the compensation threshold COMP. Accordingly, there is a risk of overshoot in the inductive current IL at the reference value Vsoft of each step. Under the condition of reasonable peripheral parameter design, the output voltage Vout can basically follow the increase of the reference value Vsoft. Therefore, although the inductive current IL at the reference value Vsoft of each step has overshoot, the overshoot is small and the inductive current increases relatively smoothly without large surge. When employing the soft-start circuit for power-up according to the first embodiment of this disclosure, the schematic diagram of output voltage Vout and inductive current IL is shown in (b) of FIG. 16. It should be noted that COMP_limit and OCP_limit in the drawing reflect the currents which are limited rather than the values of the voltage threshold COMP_limit and current threshold OCP_limit, themselves. Tstart in the drawing represents the start-up time. In the early stage of start-up, the reference value Vsoft of each step limits the compensation threshold COMP through COMP_limit, while in the later stage of startup and after normal startup, the reference value Vsoft of each step limits the peak current threshold OCP through OCP_limit. In this way, the risk of inductive current overshoot is greatly reduced, and the inductive current increases more smoothly and just has a very slight inductance surge. FIG. 17 shows the intuitive comparison between the inductive currents of an existing soft-start for power-up and the soft-start for power-up of the first embodiment.

The frequency signal used in this embodiment is generated by the standard oscillator, and its frequency is fixed. In other embodiments, such as the following embodiment 2, this frequency signal will be improved.

Second Embodiment

Figure 18:
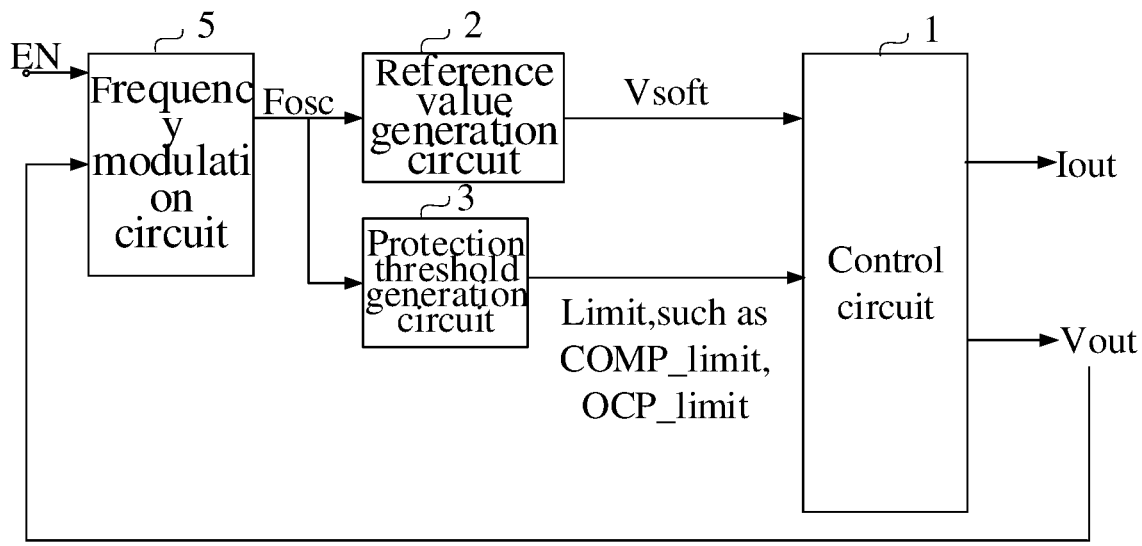
FIG. 18 is a structural diagram of a soft-start circuit for power-up according to a second embodiment of this disclosure.

Referring to FIG. 18, the difference between this embodiment and the first embodiment is that a frequency modulation circuit 5 is added to monitor the output voltage, and a positively related frequency signal Fosc is generated based on the output voltage for the soft-start circuit for power-up. The slow increase speed of the reference value Vsoft which is outputted by the reference value generation circuit 2 and/or the slow increase speed of the protection threshold Limit which is outputted by the protection threshold generation circuit 3 are positively related with the frequency signal Fosc which is outputted by the frequency modulation circuit 5.

For example, the protection threshold generation circuit 3 is specifically configured to control the stepwise increase of the protection threshold Limit based on the frequency signal, which is outputted by the frequency modulation circuit 5, during the start-up process for power-up; wherein a time step length of the stepwise increase is positively related with the frequency signal which is outputted by the frequency modulation circuit 5.

Again, for example, the reference value generation circuit 2 is specifically configured to control the stepwise increase of the reference value Vsoft based on the frequency signal, which is outputted by the frequency modulation circuit 5, during the start-up process for power-up; wherein a time step length of the stepwise increase is positively related with the frequency signal which is outputted by the frequency modulation circuit 5.

The so-called time step length refers to a time duration of each step of the stepwise voltage increase. For example, a clock signal can be generated based on the frequency signal which is outputted by the frequency modulation circuit 5. The clock signal can be used not only for counting of the counting segmentation circuit, but also as the source clock of the clock signal of the capacitor switch circuit. Therefore, the time step length is positively related with the frequency signal. Because the frequency signal which is outputted by the frequency modulation circuit 5 is positively related with the output voltage, and the time step length is positively related with the frequency signal, the time step length is also positively related with the output voltage. In this way, cooperating the modulation for the frequency signal through the output voltage with the slow increases of the reference value and the protection threshold, the average output current at this time can be limited and the risk of chip damage can be reduced, when the output voltage is small at the initial stage of start-up. Especially in abnormal circumstances, such as output short circuit, the average output current can be reduced by reducing the operation frequency, which can greatly improve the system reliability.

Figure 19:
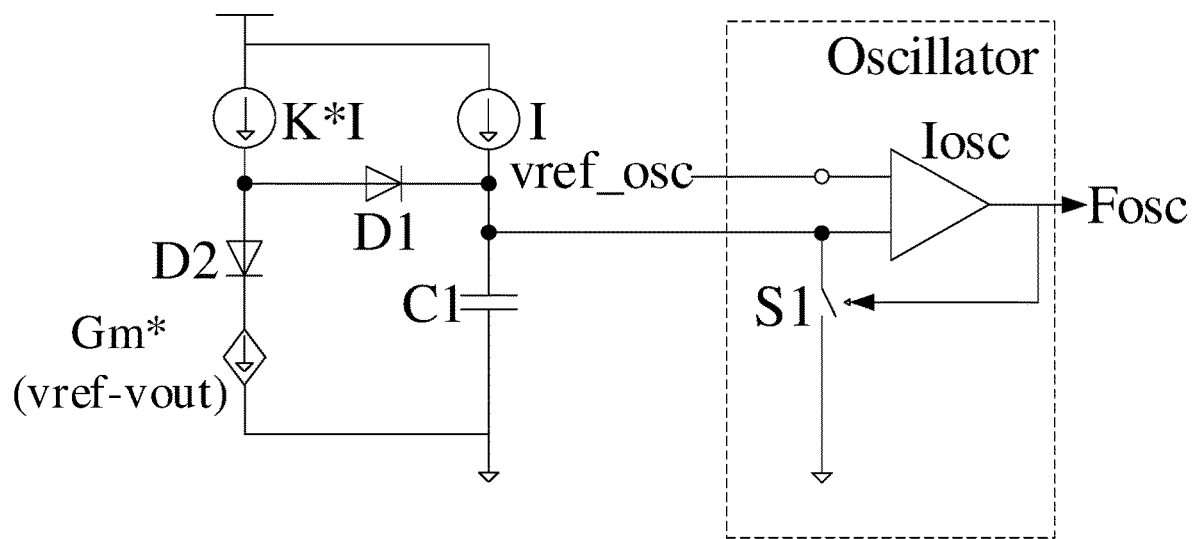
FIG. 19 is a circuit schematic diagram of a frequency modulation circuit.

Referring to FIG. 19, an example of a frequency modulation circuit 5 is given. The frequency modulation circuit 5 includes a first current source, a second current source, a first diode D1, a second diode D2, a voltage controlled current source, a first capacitor C1 and an oscillator. The voltage controlled current source is controlled by the difference between a preset voltage Vref and an output voltage Vout. An anode of the first diode D1 is connected with an output terminal of the first current source and an anode of the second diode D2. A cathode of the first diode D1 is connected with an output terminal of the second current source and a first end of the first capacitor C1, a cathode of the second diode D2 is grounded through the voltage controlled current source. A second end of the first capacitor C1 is grounded, and an input terminal of the oscillator is connected with the first end of the first capacitor C1. The oscillator generates the frequency signal Fosc based on a preset frequency modulation reference voltage vref_osc and a voltage at the first terminal of the first capacitor C1. The oscillator can be implemented by a comparator and a switch S1, which is controlled by the output frequency signal. Of course, the implementation of the oscillator is more than that. Here is only an example.

The frequency modulation circuit 5, is configured to detect the output voltage Vout and modulate the frequency signal Fosc based on the detected output voltage Vout, when a power-on enable signal EN of the whole soft-start circuit for power-up is a high level. The frequency signal Fosc is used in the generation process of the reference value Vsoft, the voltage threshold COMP_limit and the current threshold OCP_limit. For example, the frequency signal Fosc is used to generate the clock signals clka and clkb of the switch capacitor circuit for the counting of the counting segmentation circuit, thus finally controlling the time step lengths of the reference value Vsoft, the voltage threshold COMP_limit and the current threshold OCP_limit. In the initial stage of start-up, the output voltage Vout is small, the average output current at this time can be limited through the modulation for the frequency signal. Especially in abnormal circumstances, such as short circuit of output voltage Vout, the average output current can be reduced by reducing the frequency signal Fosc, which can greatly improve the system reliability. The operation principle is as follows.

Diode D1 determines that the current flowing through it can only flow from left to right, rather than in the reverse direction from right to left. Diode D2 determines that the current flowing through it can only flow from top to bottom, rather than in the reverse direction from bottom to top.

When $K*I \leq Gm*(vref-vout)$ and $vref>vout$, the current flowing through diode D1 is 0 and the current flowing through diode D2 is $Gm*(vref-vout)$. At this time, the frequency signal Fosc follows following equation:

$$F_{OSC} = \frac{I}{C*\text{vref\_osc}}. \qquad (4)$$

When $K*I \geq Gm*(vref-vout)$ and $vref>vout$, the current flowing through diode D1 is $K*I-Gm*(vref-vout)$ and the current flowing through diode D2 is $Gm*(vref-vout)$. At this time, the frequency signal Fosc follows following equation:

$$F_{OSC} = \frac{[K*I - G_m*(vref - vout)] + I}{C*\text{vref\_osc}}. \qquad (5)$$

When $vref<vout$, the current flowing through diode D1 is $K*I$ and the current flowing through diode D2 is 0. At this time, the frequency signal Fosc follows following equation:

$$F_{OSC} = \frac{(K+1)I}{C*\text{vref\_osc}}. \qquad (6)$$

Wherein $F_{osc}$ represents a frequency of the frequency signal, I represents output current of the second current source, K represents a ratio between output currents of the first current source and the second current source, Gm represents transconductance of the voltage controlled current, Vout is the output voltage, Vref is the preset voltage, C represents capacitance of the first capacitor and vref_osc represents the frequency modulation reference voltage.

Comparing the above three equations (4)-(6), it can be seen that the range of the frequency signal Fosc is [Fosc_min, Fosc_max], especially $$\frac{I}{C*\text{vref\_osc}} \leq F_{OSC} \leq \frac{(K+1)I}{C*\text{vref\_osc}}. \qquad (7)$$

In this range, the frequency signal Fosc follows equation (5). Accordingly, the frequency signal Fosc and the output voltage Vout are positively related.

Figure 20:
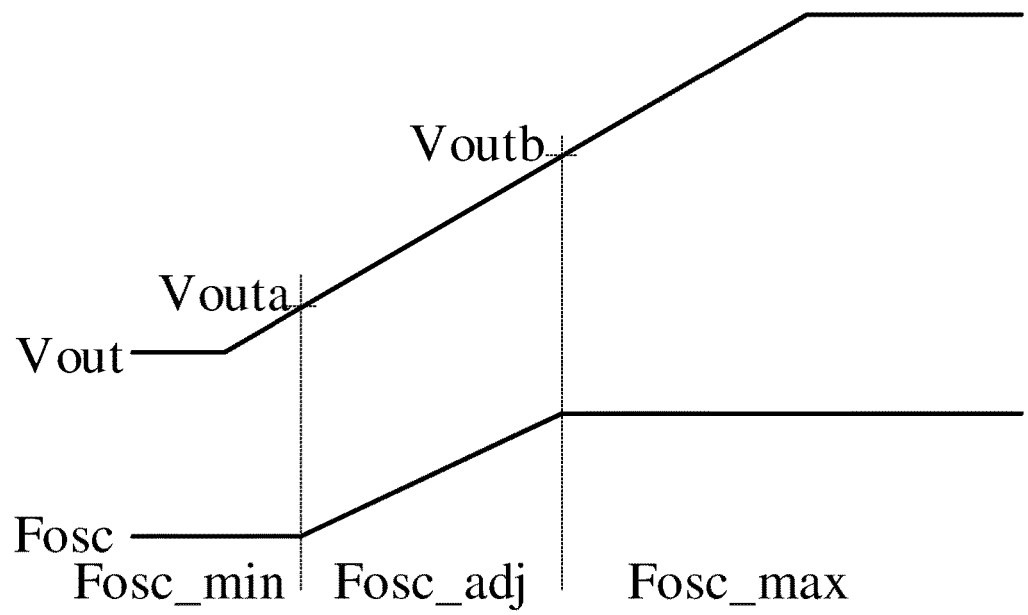
FIG. 20 is a schematic diagram of a frequency change process which corresponds to the frequency signal outputted by a frequency modulation circuit.

Referring to FIG. 20, the change process of the frequency, which corresponds to the frequency signal outputted by the frequency modulation circuit 5 is shown. It should be noted that the drawing shows the frequency value represented by the frequency signal Fosc, rather than the waveform of the frequency signal Fosc itself, which is a square wave signal. According to FIG. 20 and equation (7), by adjusting the values of K, I, Gm, Vref, the maximum value Fosc_max and the minimum value Fosc_min of the frequency signal Fosc, and the modulation range of the output voltage Vout [Vouta, Voutb] can be designed.

It can be understood that FIG. 19 is only an example of a frequency modulation circuit 5, and its function implementation method is not limited to that shown in FIG. 19, and its function realization mode is not limited to that shown in FIG. 19, and this function can be implemented through a variety of circuit structures.

Third Embodiment

Figure 21:
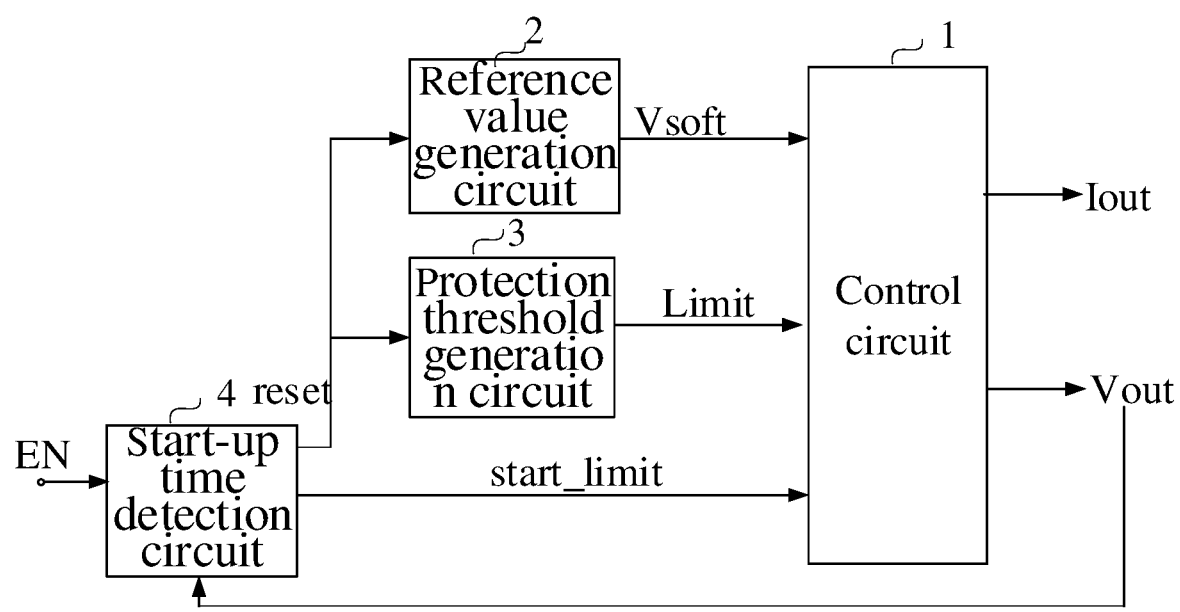
FIG. 21 is a structural diagram of a soft-start circuit for power-up according to a third embodiment of this disclosure.

Referring to FIG. 21, compared with the first embodiment, a start-up time detection circuit 4 is added in this embodiment, and configured to monitor the output voltage Vout during the start-up process for power-up, to time with the frequency signal, to control the control circuit 1 to maintain turning-on when the output voltage Vout increases to a preset value within a first start-up time T_start, and to control the control circuit 1 to turn-off when the output voltage Vout fails to increase to the preset value within the first start-up time T_start, to maintain timing and control the control circuit 1 to start again when the timing reaches a second start-up time, and to control an output reset of the reference value generation circuit 2 and the protection threshold generation circuit 3 through a reset signal reset, simultaneously; wherein the second start-up time is an integral multiple of the first start-up time.

Taking the DC-DC switch power supply of current mode as an example again, a signal start_limit, which is transmitted to the control circuit 1 from the start-up time detection circuit 4, turns over from a low lever to a high level to control the control circuit 1, monitors the output voltage Vout and times with the frequency signal, simultaneously; when the power-on enable signal EN of the whole soft-start circuit for power-up turns over from a low lever to a high level. During the first start-up time T_start (which is specifically implemented through counting based on frequency signal), the output voltage Vout increases to 50% Vout_set, then the signal start_limit maintains at the high level to control the control circuit 1 to maintain turning-on. Wherein 50% is only as an example, and different determination points can be selected according to different requirements, and Vout_set refers to the final stable value of the output voltage Vout. During the first start-up time T_start, if the output voltage Vout fails to increase to 50% Vout_set, then the signal start_limit turns over from the high level to the low level to turn off the control circuit 1 simultaneously. Meanwhile the start-up time detection circuit 4 simultaneously keeps timing until the timing reaches n*T_start (wherein n can be selected according to the actual demand), then the signal start_limit turns over from the low level to the high level, and meanwhile resets the reference value Vsoft, the voltage threshold COMP_limit and the current threshold OCP_limit through the reset signal reset. The control circuit 1 is turned on again and the soft-start process is repeated. In additional, during the first start-up time T_start, the output voltage Vout is detected again and the process is repeated. The start-up time detection circuit 4 not only ensures that the chip never operate at the maximum peak current for a long time due to abnormal conditions, such as excessive load capacitance, but also greatly reduces the average current during the short circuit for avoiding chip damage through the pulse turning on/off manner (T_start means turning on, while n*T_start means turning off) when the output voltage Vout is shorted.

Figure 22:
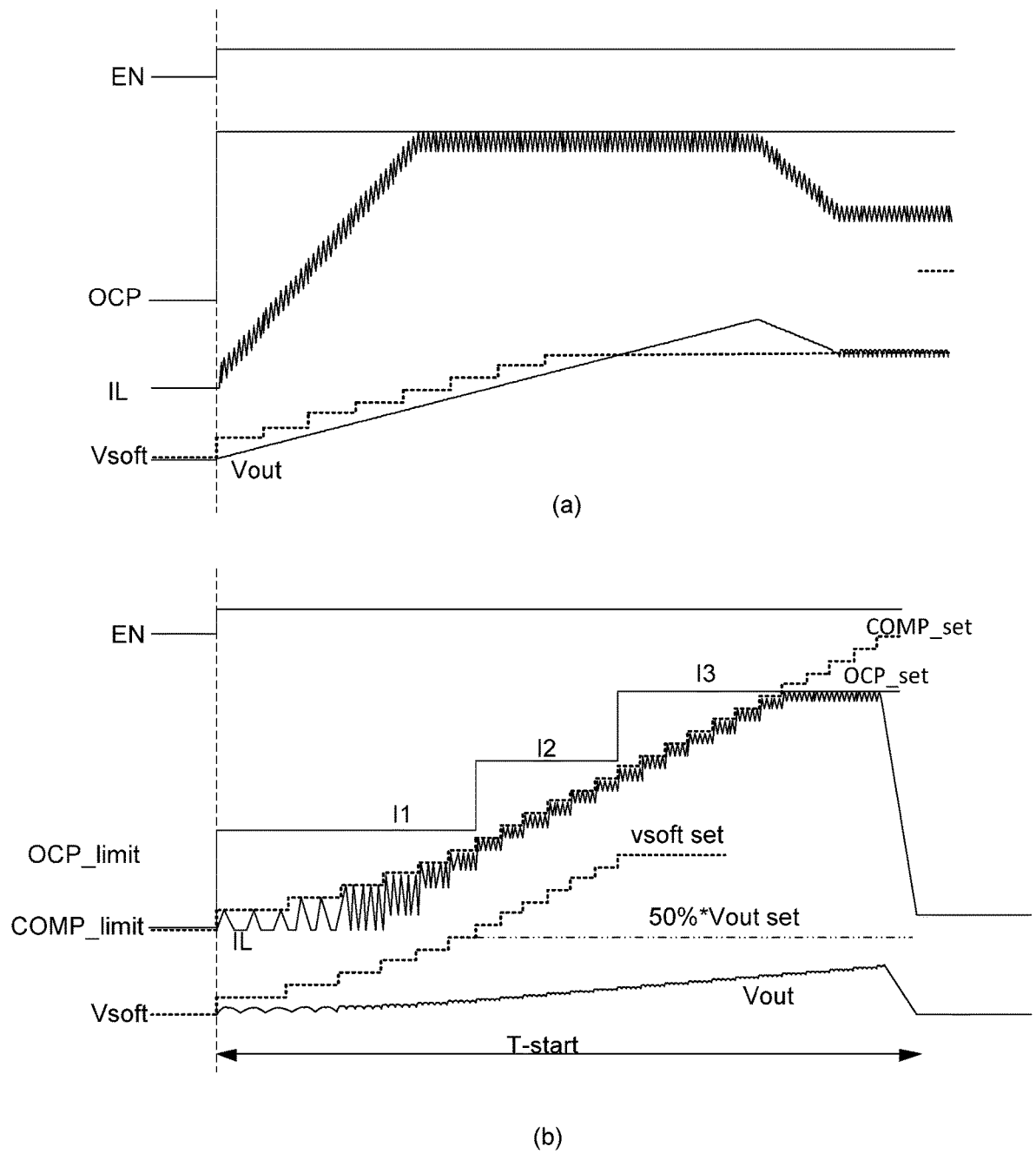
FIG. 22 is an output waveform comparison diagram between an existing soft-start for power-up and a soft-start for power-up of the third embodiment, under a large load capacitance condition.

Referring to FIG. 22, when the load capacitance is large, if the existing soft-start circuit is adopted, the schematic diagram of output voltage Vout and inductive current IL is shown in (a) of FIG. 22. Due to the large capacitance, the output voltage Vout cannot follow the increase of the reference value Vsoft, so the inductive current soon reaches the maximum peak current which is limited by the peak current threshold OCP until the output voltage Vout reaches the final stable value Vout_set. Generally, the maximum peak current which is limited by the peak current threshold OCP is greater than the maximum peak current during normal operation of control circuit 1, so the output voltage Vout overshoots during startup, and there is a risk of overvoltage. If the load capacitance is too large, the output voltage Vout takes longer time to reach the final stable value Vout_set, so the chip operates for a long time at the maximum peak current which is set by the peak current threshold OCP. Therefore, a risk of damage occurs at both the chip and inductor.

Figure 23:
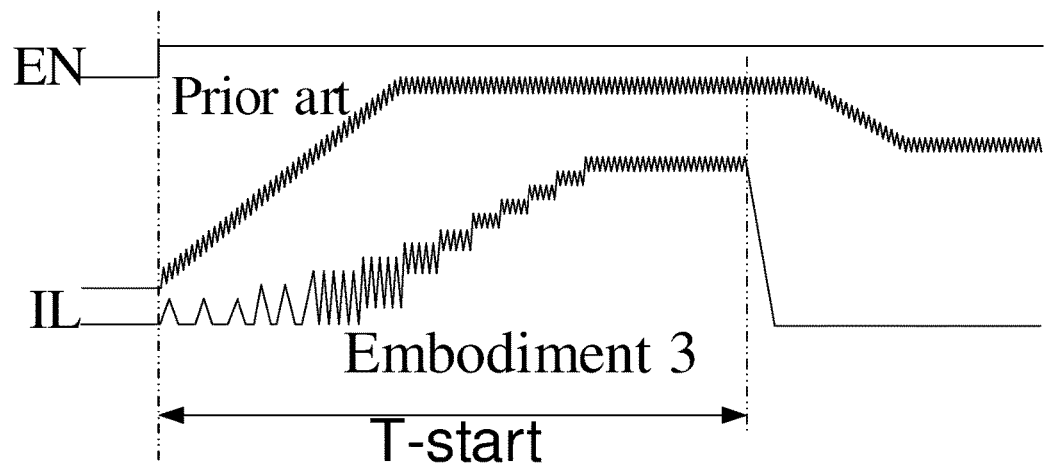
FIG. 23 is an inductive current comparison diagram between an existing soft-start for power-up and a soft-start for power-up of the third embodiment, under a large load capacitance condition.

In the soft-start circuit for power-up of this embodiment, the schematic diagram of output voltage Vout and inductive current IL is shown in (b) of FIG. 22, the compensation threshold COMP is limited by the voltage threshold COMP_limit at the reference value Vsoft of each step. Meanwhile, the peak current threshold OCP is limited in sections during the whole start-up time. Therefore, the inductive current will not operate at the maximum peak current soon during start-up. At the same time, the start-up time detection circuit 4 detects the time which is costed for the output voltage Vout to increase from 0V to 50% Vout_set. When the timing reaches the first start-up time T_start, while the output voltage Vout fails to increase to 50% Vout_set, the control circuit 1 is turned off immediately, which greatly reduces the risk of chip damage. FIG. 23 shows a direct comparison between the inductive currents of the existing soft-start for power-up and the soft-start for power-up of the third embodiment, under a large load capacitance condition. It can be seen that the inductive current of the soft-start of this disclosure, increases gradually and smoothly, and has a startup timeout detection. When the startup time exceeds the first start-up time T_start, the control circuit 1 is turned off and the inductive current reduces to 0.

Fourth Embodiment

Figure 24:
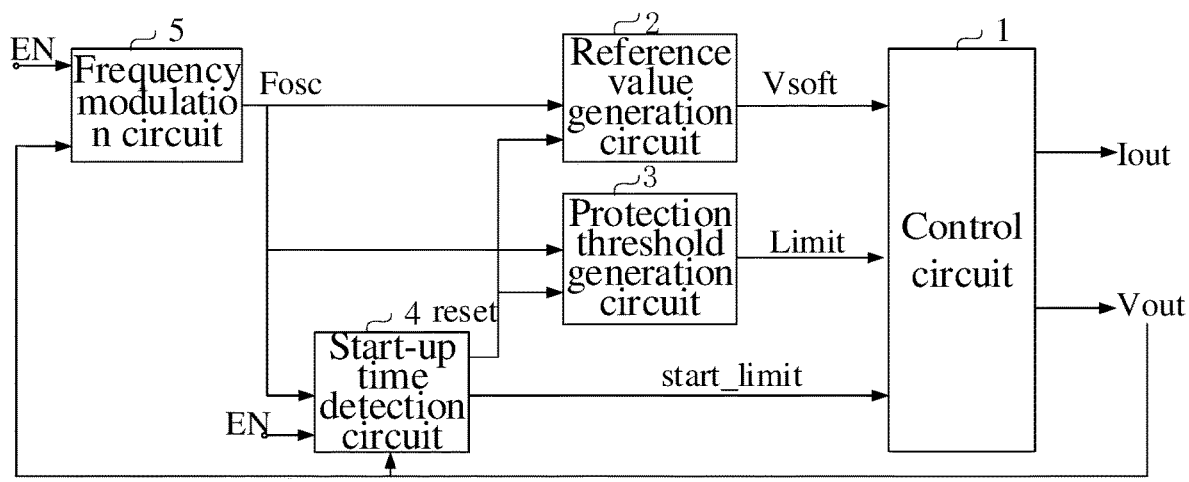
FIG. 24 is a structural diagram of a soft-start circuit for power-up according to a fourth embodiment of this disclosure.

Referring to FIG. 24, this embodiment adds the start-up time detection circuit 4 on the basis of the second embodiment, and the frequency signal used by the start-up time detection circuit 4, as well as the reference value generation circuit 2 and the protection threshold generation circuit 3, comes from the frequency modulation circuit 5. In this embodiment, in the process of power-on and start-up, the three factors of stepwise increases of the reference value and protection threshold, frequency modulation based on the output voltage and the pulse startup, work together to further improve the system reliability.

The soft-start circuit for power-up according to this disclosure has following technical effects. The reference value generation circuit of this disclosure is configured to output a reference value, which increases slowly, during a start-up process for power-up, such that the output voltage increases slowly along with the reference value, which enables the stable output of the output voltage. Meanwhile, the protection threshold generation circuit is configured to output a protection threshold, which increases slowly, during the start-up process for power-up. As the protection threshold increases slowly, its limited peak current increases slowly with the start-up progress. In this way, even if the output current must operate at the peak current, a smoother current output is realized, and operation at the maximum peak current for a long-time during start-up is not allowed, which greatly improves the risk of output current surge, and can ensure the stable output of the output voltage in the case of that the voltage follow, which is based on reference value, fails.

Furthermore, in this disclosure, a frequency modulation circuit is added to monitor the output voltage, which can generate a frequency signal positively related to the output voltage for the soft-start circuit for power-up. For example, the time step lengths of the stepwise increases of the reference value generation circuit and the protection threshold generation circuit, are positively related with the frequency signal which is outputted by the frequency modulation circuit. In this way, cooperating the modulation for the frequency signal through the output voltage with the slow increases of the reference value and the protection threshold, the average output current at this time can be limited and the risk of chip damage can be reduced, when the output voltage is small at the initial stage of start-up. Especially in abnormal circumstances, such as output short circuit, the average output current can be reduced by reducing the operation frequency, which can greatly improve the system reliability.

Furthermore, in this disclosure, a start-up time detection circuit is added. When the output voltage cannot reach the preset value for a long time due to excessive load capacitance or output short circuit, the control circuit is turned off to avoid damage which is caused by operation at the peak current for a long time.

The embodiments of the present disclosure are described above in combination with the drawings, but the present disclosure is not limited to the above specific embodiments. The above specific embodiments are only schematic, not restrictive. Ordinary technicians in the art can make many forms under the enlightenment of the present disclosure and without departing from the scope of the purpose and claims of the present disclosure, and these are within the protection of the present disclosure.

The invention claimed is:
1. A soft-start circuit for power-up, comprising:
    a reference value generation circuit, which is configured to output a reference value, which increases slowly, during a start-up process for power-up;

a protection threshold generation circuit, which is configured to output a protection threshold, which increases slowly, during the start-up process for power-up;

a control circuit, which is configured to control an output voltage to increase slowly along with the reference value based on the reference value, during the start-up process for power-up, and to limit an output current based on the protection threshold to limit the output voltage, during the start-up process for power-up.

2. The soft-start circuit for power-up according to claim 1, wherein the soft-start circuit for power-up further comprises a frequency modulation circuit, which is configured to monitor the output voltage, and generate a frequency signal, which is positively related with the output voltage, based on the output voltage, for the soft-start circuit for power-up.

3. The soft-start circuit for power-up according to claim 2, wherein a slow increase rate of the reference value which is outputted by the reference value generation circuit, and/or a slow increase rate of the protection threshold which is outputted by the protection threshold generation circuit, are positively related with the frequency signal which is outputted by the frequency modulation circuit.

4. The soft-start circuit for power-up according to claim 2, wherein the protection threshold generation circuit is specifically configured to control a stepwise increase of the protection threshold based on the frequency signal, which is outputted by the frequency modulation circuit, during the start-up process for power-up; wherein a time step length of the stepwise increase is positively related with the frequency signal which is outputted by the frequency modulation circuit.

5. The soft-start circuit for power-up according to claim 2, wherein the reference value generation circuit is specifically configured to control a stepwise increase of the reference value based on the frequency signal, which is outputted by the frequency modulation circuit, during the start-up process for power-up; wherein a time step length of the stepwise increase is positively related with the frequency signal which is outputted by the frequency modulation circuit.

6. The soft-start circuit for power-up according to claim 2, wherein the soft-start circuit for power-up further comprises a start-up time detection circuit, which is configured to monitor the output voltage during the start-up process for power-up, to time with the frequency signal which is generated by the frequency modulation circuit, to control the control circuit to maintain turning-on when the output voltage increases to a preset value within a first start-up time, and to control the control circuit to turn off when the output voltage fails to increase to the preset value within the first start-up time, to maintain timing and control the control circuit to turn on again when the timing reaches a second start-up time, and to control an output reset of the reference value generation circuit and an output reset of the protection threshold generation circuit through a reset signal, simultaneously; wherein the second start-up time is an integral multiple of the first start-up time.

7. The soft-start circuit for power-up according to claim 2, wherein the frequency modulation circuit comprises a first current source, a second current source, a first diode, a second diode, a voltage controlled current source, a first capacitor and an oscillator; wherein the voltage controlled current source is controlled by a difference between a preset voltage and the output voltage, an anode of the first diode is connected with an output terminal of the first current source and an anode of the second diode; a cathode of the first diode is connected with an output terminal of the second current source and a first end of the first capacitor, a cathode of the second diode is grounded through the voltage controlled current source; a second end of the first capacitor is grounded, and an input terminal of the oscillator is connected with the first end of the first capacitor; wherein the oscillator is configured to generate the frequency signal based on a preset frequency modulation reference voltage and a voltage at the first terminal of the first capacitor.

8. The soft-start circuit for power-up according to claim 1, wherein the soft-start circuit for power-up further comprises a start-up time detection circuit, which is configured to monitor the output voltage during the start-up process for power-up, to time with a frequency signal, to control the control circuit to maintain turning-on when the output voltage increases to a preset value within a first start-up time, and to control the control circuit to turn off when the output voltage fails to increase to the preset value within the first start-up time, to maintain timing and control the control circuit to turn on again when the timing reaches a second start-up time, and to control an output reset of the reference value generation circuit and an output reset of the protection threshold generation circuit through a reset signal, simultaneously; wherein the second start-up time is an integral multiple of the first start-up time.

9. The soft-start circuit for power-up according to claim 1, wherein the reference value and the protection threshold have a linear increase, a stepwise increase, or a curvilinear increase.

10. The soft-start circuit for power-up according to claim 1, wherein the protection threshold comprises one or more protection thresholds, wherein the protection threshold, which has a minimum final-limited output current, has a stepwise increase.

11. The soft-start circuit for power-up according to claim 10, wherein the protection threshold has multiple protection thresholds of both current values and voltage values.

12. The soft-start circuit for power-up according to claim 11, wherein when the protection threshold, which has a minimum final-limited output current, is a current value; the protection threshold, which has a minimum final-limited output current, when comparing with the protection thresholds of the voltage value, has a stepwise increase;
wherein a step number of the protection threshold of the voltage value is greater than a step number of the protection threshold of the current value.

13. The soft-start circuit for power-up according to claim 1, wherein the reference value is a voltage value, while the protection threshold is a current value or a voltage value which corresponds to the current value.

14. The soft-start circuit for power-up according to claim 13, wherein the soft-start circuit for power-up comprises a counting segmentation circuit or capacitor charge circuit which is configured to implement a slow increase of the voltage value.

15. The soft-start circuit for power-up according to claim 14, wherein the capacitor charge circuit is specifically configured to output a slowly increased voltage through charge accumulation; or to generate a clock signal by using a frequency signal, and control cyclical charge storage and transfer according to the clock signal, and increase one gradient to its output voltage for each charge transfer.

16. The soft-start circuit for power-up according to claim 14, wherein the counting segmentation circuit is specifically configured to perform a real-time count by using a frequency signal, and control its output voltage to increase one gradient and start a new round of count when each round of count reaches a target value.

17. The soft-start circuit for power-up according to claim 13, wherein the soft-start circuit for power-up comprises the soft-start circuit for power-up comprises a counting segmentation circuit which is configured to implement a slow increase of the current value; or the soft-start circuit for power-up comprises a counting segmentation circuit or capacitor charge circuit which is configured to implement a slow increase of the voltage value, and a current mirror which configured to process an output of the slow increase of the voltage value to generate the slow increase of the current value.

18. The soft-start circuit for power-up according to claim 17, wherein the capacitor charge circuit is specifically configured to output a slowly increased voltage through charge accumulation; or to generate a clock signal by using a frequency signal, and control cyclical charge storage and transfer according to the clock signal, and increase one gradient to its output voltage for each charge transfer.

19. The soft-start circuit for power-up according to claim 17, wherein the counting segmentation circuit is specifically configured to perform a real-time counting by using a frequency signal, and control its output current to increase one gradient and start a new round of count when each round of count reaches a target value.

* * * * *